No. 677,207. Patented June 25, 1901.
C. M. HALL.
PROCESS OF PURIFYING BAUXITE.
(Application filed Dec. 19, 1900.)
(No Model.)
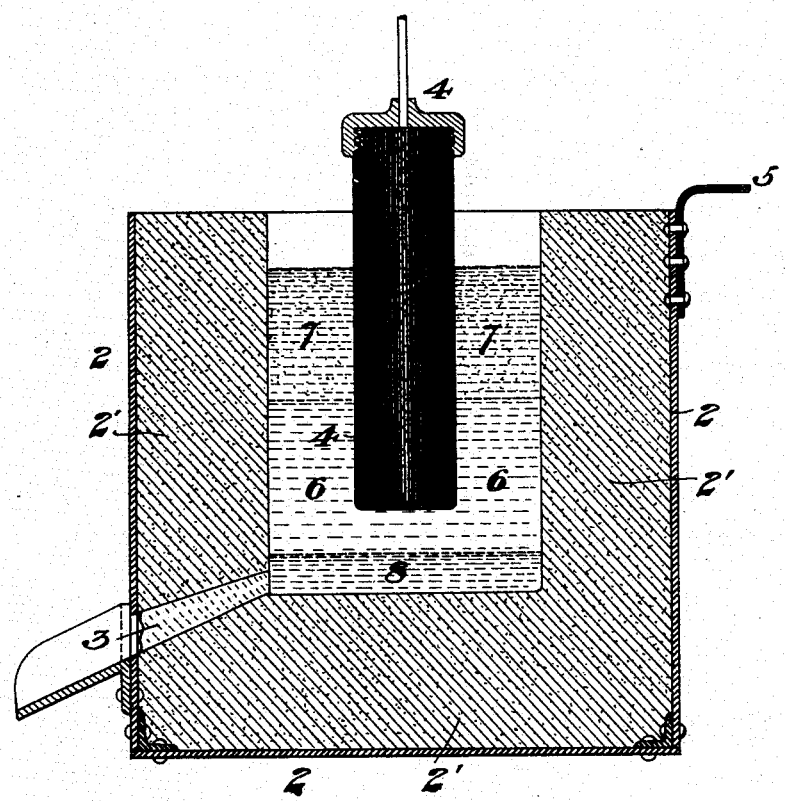
WITNESSES
INVENTOR
Charles M. Hall
by Thomas W. Bakewell
his Attorney.

UNITED STATES PATENT OFFICE.

CHARLES M. HALL, OF NIAGARA FALLS, NEW YORK.

PROCESS OF PURIFYING BAUXITE.

SPECIFICATION forming part of Letters Patent No. 677,207, dated June 25, 1901.

Application filed December 19, 1900. Serial No. 40,369. (No specimens.)

*To all whom it may concern:*

Be it known that I, CHARLES MARTIN HALL, of Niagara Falls, in the county of Niagara and State of New York, have invented a new and useful Process of Purifying Bauxite or other Impure Oxid of Aluminium, of which the following is a full, clear, and exact description.

It is a matter of great importance in the manufacture of aluminium that the alumina to be electrolyzed should be free from impurities, for the character of the ore determines largely the quality of the aluminium which is produced from it. Heretofore bauxite has been purified commonly by a chemical process which consists in converting the alumina of bauxite into aluminate of soda, dissolving the same in water, filtering, and precipitating by carbonic dioxid or by agitation, thus yielding a precipitate of hydrate of alumina, which must be washed, dried, and calcined at a bright-red heat. In this process the number of reagents employed, particularly the soda and the carbonic dioxid, and the operations required all add to the expense of manufacture, making the cost of the finished alumina many times that of the crude ore.

The object of my invention is to provide a process of manufacture by which purified alumina can be obtained directly from the impure ore at a comparatively low cost and with many other advantages in respect of purity of product and simplicity of apparatus, which render my process of great practical value. Attempts heretofore made to separate these impurities and to obtain pure alumina by electrolytic or reduction methods have been unsuccessful. Thus it has been attempten to separate the silica and other impurities by dissolving the impure calcined bauxite in the fused cryolite or double fluorid bath used for the manufacture of aluminium by electrolysis and electrolyzing the same at the comparatively low temperature of such bath with the object of first reducing the impurities, leaving the bulk of the alumina purified and unreduced, afterward separating the bath containing the alumina from the reduced impurities, and electrolyzing the bath containing the unreduced alumina to produce pure aluminium. This procedure, however, was not successful, because instead of all the impurities being reduced in the initial stage of the operation, leaving the bath pure, as was expected, it was found that a large percentage of the impurities would remain in the bath and by being reduced with the alumina would contaminate the product. I have discovered, however, that bauxite and other impure oxids of aluminium containing silicon as an impurity (in which I include the silicates of aluminium) may be purified by fusing such oxid by means of an electric current without any flux or with only a small proportion of flux and subjecting it to a reducing action for a sufficient time to reduce the impurities, leaving the bulk of the alumina unreduced, the said impurities (silicon and generally titanium) as they are being reduced being caused to combine into a fused alloy with a metal, such as iron, which alloy will segregate from the fused alumina and may be readily removed. When the bauxite or other impure oxid of aluminium contains a considerable percentage of iron oxid, the iron will be reduced in the process and will furnish the metal to alloy with the impurities; but where there is only a small percentage of iron or no iron in the aluminium oxid, or where the proportion of silica and titanic acid therein is high relatively to the iron, it is advisable to add iron either in the form of oxid or in metallic form, or some other heavy metal or metallic oxid which will form a fused alloy with the reduced silicon and titanium.

I will now describe the preferable form of my process, in which I purify bauxite containing sufficient iron, so that when the bauxite is fused and the impurities reduced therefrom there will result a fused alloy of silicon, iron, and titanium, which will segregate in the form of globules or large masses and can readily be removed.

I take bauxite which may be approximately of the following composition, though the process is applicable to the treatment of bauxite of various grades and kinds of impurities: alumina, sixty per cent.; ferric oxid, eighteen per cent.; silica, two to three per cent.; titanic acid, three to four per cent., and water, seventeen per cent. I preferably calcine the bauxite to remove the water, and before calcination I may mix with it some powdered carbon, (charcoal, coke, &c.,) which may be in the proportion of about five to ten per cent., in order to remove the water more completely and reduce to some extent the contained oxid of iron to the metallic form or to a lower state of oxidation, and thus lessen the work required in the subsequent operation. I then place the bauxite in a suitable electric furnace, preferably lined with carbon, and fuse it therein, preferably first mixing with it powdered carbon sufficient with that remaining from the previous calcination to amount to eight to ten per cent., more or less, in order to assist in the reduction, although this is not always necessary, since the carbon of the electrodes and of the furnace-lining will suffice. A more impure bauxite will require a greater percentage of carbon. I deem it desirable to avoid any large excess of carbon, which causes a waste of the alumina and has a prejudicial effect on the working of the process.

I may use either a direct or an alternating current at an electromotive force of, say, twenty-five to thirty volts with a suitable volume. Working on a small scale, with a furnace of about eight inches internal diameter, I have employed about twenty-eight volts and about fifteen hundred amperes. I subject the mass to the fusing action of the current for some time, depending upon the size of the operation. When working on the small scale above mentioned, I have found one hour sufficient to accomplish both the fusion of the bauxite and the reduction of the impurities. During this time by the action of the carbon, and where a direct current is used and the conditions for electrolysis are present by the electrolytic action of the current, the iron, silicon, and titanium are reduced and unite to form a fused alloy, the bulk of which settles to the bottom. The mass is then allowed to cool and is taken from the furnace and the iron containing the other impurities is separated from it, the finer particles of the alloy which remain shotted through the mass being picked out by a magnet or otherwise. When working on a large scale, it may be found desirable to tap off the purified alumina and the reduced alloy in a melted condition.

When the alumina has been removed from the furnace after it has been purified as above described, it is pulverized, and in this state it may be dissolved in fused baths and electrolyzed for the production of aluminium, for which purpose it is well adapted by reason of its freedom from soda, which is always present, as an impurity in the commercial alumina made by processes heretofore known.

I have not been able to obtain the results of my invention by mere fusion of the material, but have found it necessary to conduct the process in such way as to generate a very intense heat, or, where the temperature is comparatively low, so that the operation is prolonged for a considerable time.

In the drawing I show one form of electric furnace suitable for the practice of my invention.

2 is the body of the furnace, having a carbon lining 2', a tapping-hole 3, a rod 4, constituting an electrode, and conductors 5. The melted alumina is represented at 6, the yet unmelted charge at 7, and the layer of reduced impurities at 8. In this furnace the hanging electrode 4 is connected with one of the poles of the dynamo, and the furnace-lining is connected with the other pole and serves as the other electrode. I may, however, use two suspended rods, each constituting an electrode and connected with one of the poles of the dynamo.

While the operation is proceeding the melted alumina should be well covered. This may be done with a layer of unfused bauxite, which may in its turn be melted, or toward the end of the operation it may be covered with a layer of carbon or previously-purified alumina.

Within the scope of my invention as defined in the claims I may modify the steps of the process, and may use furnaces of various forms—such as electrical arc furnaces or incandescent furnaces, either of the style in which the heat is generated in the material itself or in a mass of carbon in proximity to the charge. I have also obtained excellent results by raising the electrode slightly above the melted material, apparently forming an arc. The current which I then used was an alternating current of about sixty volts and about fifteen hundred to two thousands amperes. The operation was in a furnace having a cavity of about sixteen inches diameter and twenty-four inches deep.

I believe that I am the first to purify bauxite or impure aluminium oxid by fusing it, reducing and separating from it silicon and titanium in the form of a fused metallic alloy, stopping the reduction when the impurities are substantially reduced, and then removing the alumina from the furnace for use. By this operation I effect a great saving in the cost of manufacture of alumina and am enabled to cheapen correspondingly the aluminium produced by electrolysis therefrom.

I claim—

1. The method of purifying bauxite or other impure oxid of aluminium containing silica, which consists in fusing the same with an electric current, and while fused reducing the silica therein in the presence of a metal capable of alloying with the silicon, causing the silicon and said metal to unite in a fused alloy, and then removing the purified alumina from the furnace; substantially as described.

2. The method herein described of purifying bauxite or other impure oxid of aluminium containing iron and silicon, which consists in fusing the same with an electric current, and while fused reducing the iron and silicon therein, causing them to unite in a fused alloy, and then removing the purified alumina from the furnace for use; substantially as described.

3. The method herein described of purifying bauxite or impure oxid of aluminium containing iron and silicon, which consists in fusing the same, reducing the iron and silicon therein, causing the silicon to alloy with the iron whereby its separation from the alumina is facilitated, stopping the operation nearly at the time when the impurities are reduced, and then removing the purified alumina from the furnace for use; substantially as described.

4. The method herein described of purifying bauxite or other impure oxid of aluminium containing iron, titanium and silicon, which consists in fusing the same with an electric current, and while fused reducing the iron, silicon and titanium therein, causing them to unite in a fused alloy, and then removing the purified alumina from the furnace for use; substantially as described.

5. The method herein described of purifying bauxite or other impure oxid of aluminium containing iron and silicon, which consists in fusing the same in an electric furnace in the presence of carbon, reducing the iron and silicon therein, causing the impurities to unite in the form of an alloy, whereby their separation from the alumina is facilitated, and afterward removing the purified alumina for use; substantially as described.

6. The method herein described of purifying bauxite or other impure oxid of aluminium containing iron and silicon, which consists in fusing the same, reducing the impurities therein and causing them to separate in the form of a molten alloy and to settle to the bottom of the fused mass, and then removing the purified alumina for use; substantially as described.

7. The method herein described of purifying bauxite or other impure oxid of aluminium, which consists in calcining the same in admixture with carbon, fusing the calcined material in an electric furnace, reducing the impurities and then removing the purified alumina for use; substantially as described.

8. The method herein described of purifying impure bauxite low in iron and containing silicon, which consists in adding to it a heavy metal or compound of said metal capable of alloying with silicon, fusing the bauxite and reducing the impurities and causing them to separate in the form of an alloy with the metal so added; substantially as described.

In testimony whereof I have hereunto set my hand.

CHARLES M. HALL.

Witnesses:
W. S. FERGUSON,
K. M. FLAHERTY.